Figures 1, 2, 3:
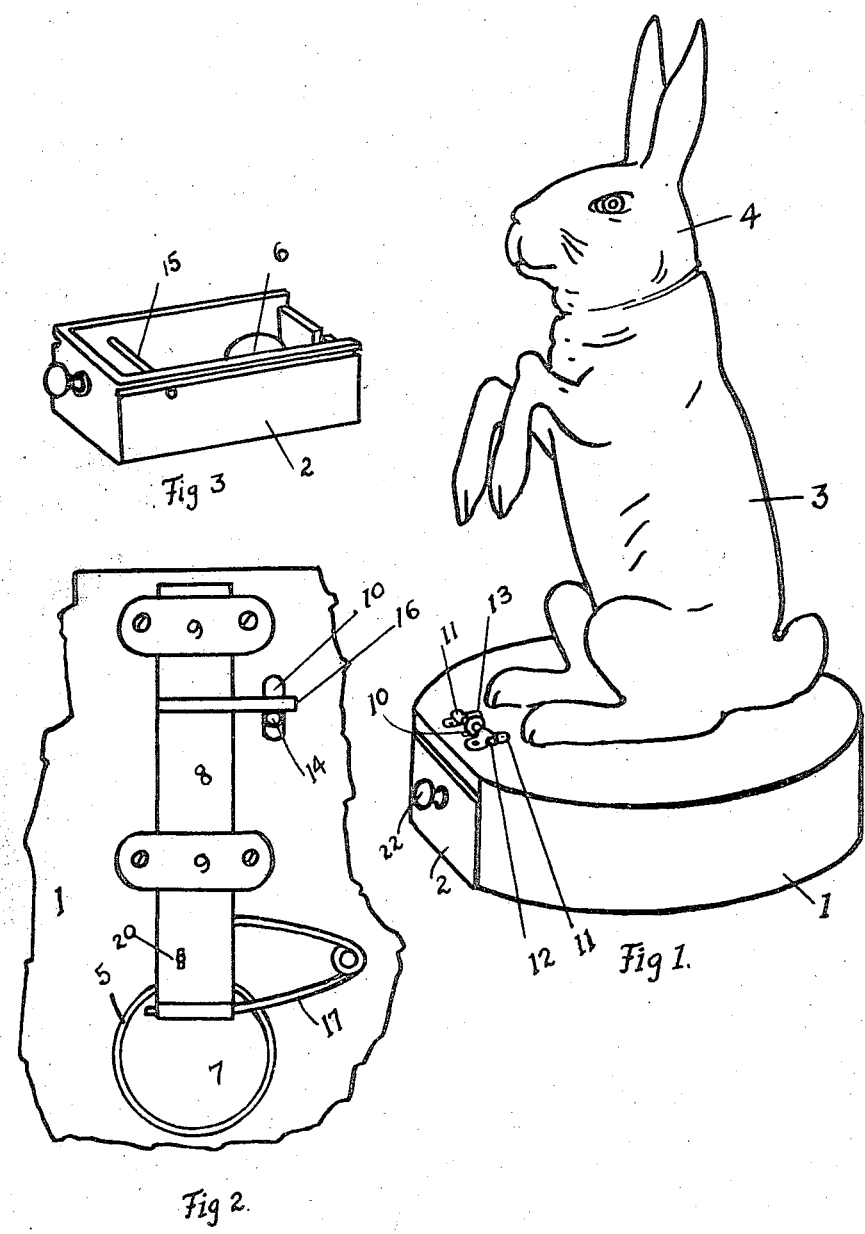

Feb. 26, 1924.

R. H. SCHEIBERT 1,484,796

EGG LAYING TOY

Filed June 16, 1922

2 Sheets-Sheet 1

INVENTOR
Rudolph H. Scheibert,
BY Howard D. Smith,
His ATTORNEY

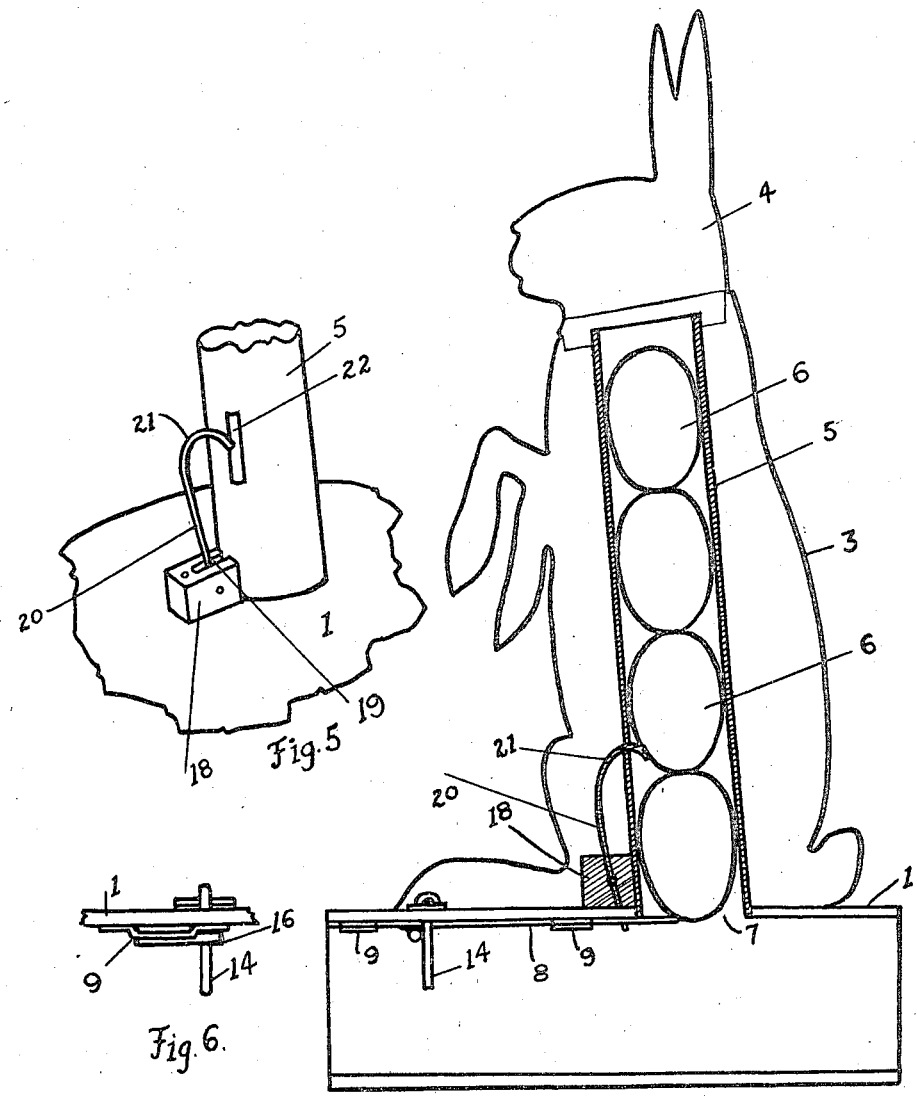

Patented Feb. 26, 1924.

1,484,796

UNITED STATES PATENT OFFICE.

RUDOLPH H. SCHEIBERT, OF CINCINNATI, OHIO, ASSIGNOR OF ONE-FOURTH TO CORA M. McCLANAHAN, OF CINCINNATI, OHIO, AND ONE-FOURTH TO NANCY D. SHELTON, OF COVINGTON, KENTUCKY.

EGG-LAYING TOY.

Application filed June 16, 1922. Serial No. 568,674.

*To all whom it may concern:*

Be it known that I, RUDOLPH H. SCHEIBERT, a citizen of the United States, residing in the city of Cincinnati, in the county of Hamilton and State of Ohio, have invented certain new and useful Improvements in Egg-Laying Toys, of which the following is a specification.

The principal object of my invention is to provide an egg-laying toy which comprises an animal seated over a drawer into which an egg falls from the animal each time the drawer is opened. The toy is simple in construction, it is easy for a child to operate, and is an object of amusement and instruction for children, particularly at Easter time.

Other important and incidental objects will be brought out in the following specification and particularly set forth in the subjoined claims.

In the accompanying drawings, Figure 1 is a perspective view of my improved egg-laying toy, showing a toy rabbit mounted upon the drawer container. Figure 2 is a bottom plan view of the top of said container, showing the slide mechanism operated by the drawer for releasing the eggs. Figure 3 is a perspective view of the drawer. Figure 4 is a side view of the toy partly in section to show the egg holder within the toy rabbit and the egg releasing and sustaining means. Figure 5 is a perspective view of the means for preventing the release of more than one egg at a time. And Figure 6 is an end view of the egg releasing means.

Throughout the specification and drawings, similar reference characters denote corresponding parts.

Referring to the accompanying drawings for a detailed description of the form of embodiment of my invention illustrated therein, the numeral 1 designates a preferably round hollow base or container into and out of a cut-away portion in which an egg-receiving drawer 2 is movable. Mounted upon the top of the base 1, preferably facing in the direction the drawer 2 is outwardly movable, is a toy rabbit body 3 having a removable head 4. While I have illustrated a toy rabbit as seated upon the base 1, any other egg-laying animal may be employed if desired.

Projecting upwardly from the top of the base 1 into the rabbit body 3, which is hollow, is an egg-receiving tube 5 which at its lower end opens into the base 1 to permit eggs 6, preferably of the imitation type, to fall into the drawer 2 when released one at a time by the mechanism now to be described.

The tube 5 is tightly fitted at its lower end in a hole 7 in the top of the base 1. Beneath this hole the rear end of a slide 8 is adapted to be moved a sufficient distance to restrain the eggs 6 from falling from the tube into the drawer below. The slide 8, which is supported by guides 9, 9 secured to the top of the base 1, is adapted to be moved outwardly by the following means to permit an egg to fall into the drawer 2 each time the latter is pulled outwardly.

Provided in the top of the base 1, near its front edge, is a radial slot 10 over which there transversely projects between bracket pieces 11, 11, a pivot pin 12. (See Figures 1 and 2.) Loosely surrounding the pin 12 is the hook portion 13 of a trip pin 14 which projects downwardly through the slot 10 a sufficient distance for engagement by a rod 15 which projects transversely from one side to the other side of the drawer 2 near the front end of the latter. When engaged and moved forwardly by this rod 15, each time the drawer 2 is pulled outwardly, the trip pin 14 will engage and push outwardly a transverse pin 16 secured to the slide 8, to move the latter a sufficient distance from beneath the hole 7 in the top of the base 1 to release an egg 6 from the tube 5. Before the drawer 2 is drawn out of the base 1, the egg will fall into the former to give the impression that the rabbit has laid an egg therein. Secured to the rear end of the slide 8 is the free end of semi-elliptic spring 17 firmly secured to the under side of the top of the base 1, to return the slide to its egg holding position beneath the hole 7 when the drawer rod 15 has passed the trip pin 14 during the outward movement of the drawer. (See Figures 1, 2, 3 and 4)

The means for preventing the release of but one egg at a time by the slide 8 when the drawer 2 is drawn outwardly, will now be explained. Secured upon the top of the base 1 in front of the tube 5, is a block 18 having a longitudinal groove 19 in its rear end. Pivotally secured in this groove is a spring element 20 having a hook-shaped end 21 which projects into a vertical slot 22 in the tube 5 to engage, and restrain the downward movement of, the egg immediately above the one that is released when the drawer 2 is pulled outwardly. The lower end of the spring element 20 projects through a slot in the top of the base 1, and a hole in the slide 8, so that it may be drawn outwardly by the latter to force its hook-shaped end 21 into engagement with the egg above the one being released by the outwardly moving slide. Then, when the slide is again moved inwardly by the spring 17, the lower end of the spring element 20 will be pushed inwardly to withdraw its hook-shaped end 21 from engagement with the egg above mentioned, to permit it to descend into the position of the one just released. (See Figures 4 and 5.)

In operation, the head 4 of the rabbit is removed from its body portion 3 to permit one or more eggs 6 to be inserted in the tube 5. The head 4 is then replaced and the drawer 2 drawn outwardly by a knob 22 on its front end. When the drawer is drawn outwardly, its transverse rod 15 will engage the trip pin 14 to cause the latter to engage the pin 16 on the slide 8 to move the latter outwardly a sufficient distance to uncover the opening 7 in the top of the base 1, whereupon an egg will fall from the tube 5 into the drawer 2. When this egg is released, the remaining ones will be restrained from falling into the drawer by the spring element 20 whose operation has just been described. Each time the drawer is pulled out, an additional egg will be deposited in it until all the eggs in the tube 5 have been released, thus giving the impression that the rabbit lays an egg in the drawer each time it is drawn out.

I do not wish to be limited to the details of construction and arrangement herein shown and described, and any changes or modifications may be made therein within the scope of the subjoined claim.

Having described my invention, I claim:

In a toy of the type described, the combination with a hollow base having a hole in its top portion, of a hollow object representing an animal, mounted upon said base over said hole, an outwardly movable drawer in said base beneath said hole, a number of superimposed eggs within said hollow object, a slide movable beneath said hole for preventing said eggs from dropping through the hole in the top portion of said base when the drawer is in its closed position, means operable by said drawer when pulled outwardly, to withdraw said movable slide from said hole, to permit the lowermost egg to descend into said drawer, and a spring element pivotally secured within said hollow object, the lower end of said element being connected to the slide and the upper end of said element being curved to resiliently engage the egg next above the one to be released, to prevent it and the eggs above from falling into said drawer when the slide is drawn outwardly by the latter.

In testimony whereof I have hereunto set my hand this 8 day of June, 1922.

RUDOLPH H. SCHEIBERT

Witness:
F. W. MINNES.